Figure 1:
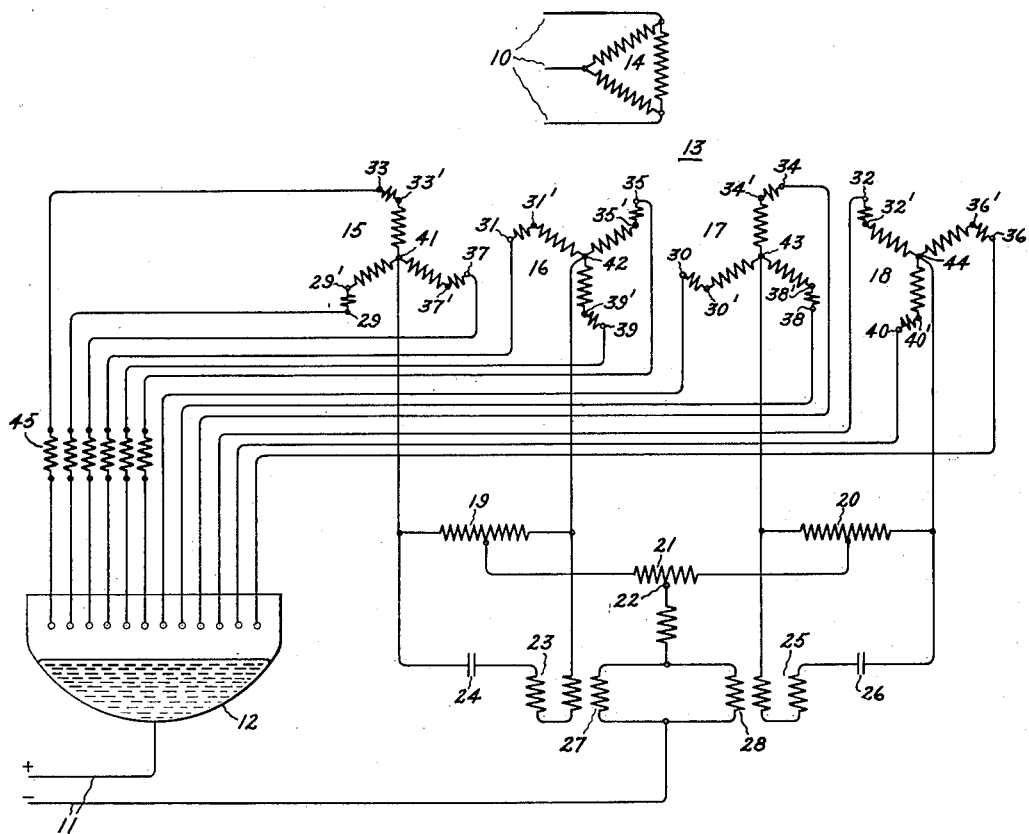

Aug. 22, 1933.       C. A. SABBAH       1,923,749
MEANS FOR PREVENTING UNBALANCE IN RECTIFIER COMPOUNDING SYSTEMS
Filed Feb. 27, 1932       2 Sheets-Sheet 1

Inventor:
Camil A. Sabbah,
by Charles E. Tullar
His Attorney.

Aug. 22, 1933.    C. A. SABBAH    1,923,749
MEANS FOR PREVENTING UNBALANCE IN RECTIFIER COMPOUNDING SYSTEMS
Filed Feb. 27, 1932    2 Sheets-Sheet 2

Inventor:
Camil A. Sabbah,
by Charles E. Tullar
His Attorney.

Patented Aug. 22, 1933

1,923,749

UNITED STATES PATENT OFFICE 1,923,749

MEANS FOR PREVENTING UNBALANCE IN RECTIFIER COMPOUNDING SYSTEMS

Camil A. Sabbah, Schenectady, N. Y., assignor to General Electric Company, a Corporation of New York Application February 27, 1932
Serial No. 595,534

11 Claims. (Cl. 175—363)

My invention relates to electric systems wherein power is interchanged between direct and alternating current circuits through means comprising an electric discharge apparatus such as a mercury arc rectifier, particularly to means for providing compound operation of such systems, and has for its principal object the provision of an improved arrangement whereby the voltage of the direct current circuit may be maintained substantially independent of variation in the magnitude of the direct current load or may be made to vary in a predetermined manner as this load increases.

In a copending application, Serial No. 347,399, assigned to the same assignee as the present application a rectifying apparatus is disclosed wherein regulation of the direct current circuit is effected by means of an interphase connection including predetermined inductive and capacitive impedances so arranged as to produce an effective impedance which varies inversely as a direct current load. This interphase connection may include a reactor, an auxiliary transformer and a condenser arranged to produce such variation in the impedance of the transformer connection that the output voltage of the rectifier will rise as the direct current load increases, the extent of this rise and the degree of compounding being determined by the constants of the interphase circuit connections.

It is sometimes desirable to utilize an interphase connection similar to the above to regulate the voltage of rectifiers or the like which are arranged for 12-phase operation. As is well understood by those skilled in the art, a 12-phase rectifying system may be made up of two 6-phase systems each of which includes an interphase transformer, a reactor and a condenser. In the adaptation to such 12-phase systems of the above invention disclosed in application Serial No. 347,399 difficulty has been encountered due to the fact that the reactive voltage of the main transformer tends to cause unequal distribution of the load between the two interphase connections, one of the interphase connections being subjected to the larger load when the phase rotation of the main transformer is in one direction and the other interphase connection having the larger load when the phase rotation of the main transformer is in the opposite direction.

Various means have been proposed for obviating the above difficulty met with in the operation of the hereinbefore described compounding system comprising a capacitive impedance in series with an inductive impedance in the interphase connection. It has been proposed, for example, to connect saturable reactors in series with the outputs of the interphase transformers associated respectively with the two 6-phase systems. However, since the voltage difference in the outputs of the two 6-phase groups caused by the reactive voltage of the main transformer is a D. C. voltage it cannot be balanced out by reactors placed in series with any D. C. link in the system.

In accordance with my invention the unbalancing in the outputs of the two 6-phase systems is obviated by the provision of reactors connected in series with windings of the main transformer apparatus which impresses potentials on the anodes from the alternating current circuit, the transformer windings with which the reactors are connected being associated with that 6-phase system, the output of which tends to rise above the output of the other 6-phase system. The reactors may be connected either in series with the anode leads from the main transformer secondaries of the 6-phase system having the larger load, or in series with the leads of A. C. main transformer primary windings associated with the main transformer secondaries comprised in that one of the 6-phase systems which has the larger load.

My invention will be better understood from the following description when considered in connection with the accompanying drawings and the scope will be pointed out in the appended claims.

Figure 2:
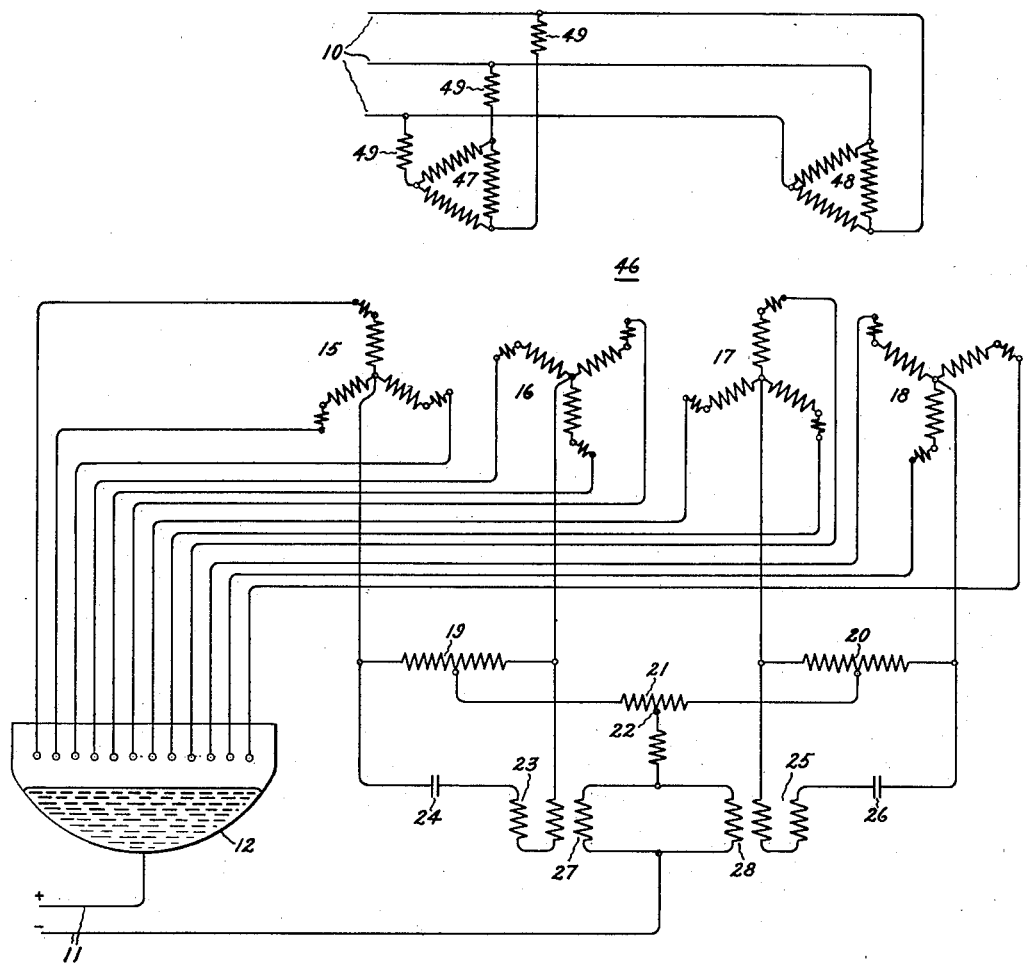

Referring to the drawings, Fig. 1 is a diagrammatic representation of a rectifier system in which that form of my invention has been embodied in which reactors are provided in anode leads; Fig. 2 is similar to Fig. 1 but illustrates that form of my invention in which reactors are provided in primary winding leads of a main transformer.

In Fig. 1 the rectifier system includes alternating current supply terminals 10 and direct current terminals 11 between which power is transmitted through an electric discharge apparatus such as a rectifier 12 and a main transformer apparatus 13. The transformer apparatus 13 is provided with a single primary winding 14 and with four star-connected secondary windings 15, 16, 17, 18. The neutral terminals of the secondary windings 15 and 16 are interconnected through an interphase transformer 19 and the neutral terminals of the secondary windings 17, 18 are likewise interconnected through an interphase transformer 20. Connected between the interphase transformers 19 and 20 is a winding 21 or 3rd interphase transformer provided with a midterminal 22 which is connected to the negative side of the direct current circuit. The 3rd interphase transformer is preferably provided with an air gap and arranged so that considerable leakage is present in the magnetic circuit.

The transformer windings 15, 16 form in effect a 6-phase system. The interphase connection of this system includes the interphase transformer 19, a reactor 23 and a condenser 24. The interphase connection of the 6-phase system formed by the windings 17, 18 includes the interphase transformer 20, a reactor 25 and a condenser 26. The reactors 23 and 25 are provided respectively with D. C. windings 27 and 28 which are connected in series with the load circuit of the rectifier. As the saturation in the reactors 23, 25 varies due to the effect of windings 27, 28 the reactance in the compounding circuits comprising these reactors also varies, thus varying in turn the compounding effect in the system and with it the rectifier voltage.

As previously explained, the effect of the reactive voltage in the main transformer 13 is to cause the 6-phase system including the windings 15, 16 to take more load than the 6-phase system including the windings 17, 18 when the phase rotation of the transformer 13 is in one direction and to cause the 6-phase system including the windings 17, 18 to take more load than the 6-phase system including the windings 15, 16 when the phase rotation of the transformer is in the other direction.

The phase terminals 29 to 40 of secondaries 15 to 18 are connected respectively to the anodes of rectifier 12, which fire or start to carry current in the order determined by the sequence of numerals 29 to 40 representing these phase terminals in the drawings. The numerals 41, 42, 43, 44 represent respectively the neutral terminals of secondaries 15, 16, 17, 18 and the numerals 29' to 40' represent the connection points of the main windings and the corresponding stub windings of these zigzag-wound star-connected secondaries 15, 16, 17, 18.

Assuming that at a given time the anodes which are active are those connected to terminals 32, 33, 34, 35 respectively, then when that anode starts which is next in the firing sequence, i. e., the anode which is connected to terminal 36 of the 6-phase system comprising secondaries 17, 18, the commutating process adds to the voltage in phase 44, 32 half of the difference between the voltage in phase 44, 36 and phase 44, 32. But since the stub winding portion 32', 32 of phase 44, 32 of the 6-phase system comprising secondaries 17, 18, is in the same direction as the main winding portion 41, 33' of phase 41, 33, which is in the 6-phase system comprising secondaries 15, 16, the voltage of phase 41, 33 will be raised a corresponding amount if the coupling between phases is 100%, or will be raised a less amount in accordance with the magnetic linkage.

As a result of the above described action the phase voltage of the 6-phase system comprising secondaries 15, 16 will be increased since the anode connected to phase 41, 33 is active. The anode current of the group will also be increased.

Assuming next that the anodes connected to terminals 33, 34, 35, 36 are active, then when the succeeding anode starts, which is the anode connected to terminal 37 of the 6-phase system comprising secondaries 15, 16, half of the commutating voltage will be added to phase 41, 33. Since the stub portion 33', 33 of phase 41, 33 is in the same direction as the main winding 44, 32' of phase 44, 32, of the 6-phase system comprising secondaries 17, 18, the voltage of phase 44, 32 will be increased. However, since the anode connected to phase 44, 32 is idle the direct current output of the 6-phase system comprising secondaries 17, 18 will not be increased. This is true if commutation occurs between phase 44, 36 and phase 44, 32.

A similar analysis can be made, leading to the same conclusion, if commutation occurs between phase 44, 36 and phase 44, 35, that is if the active anode period is less than 120°. In this case the unbalance will depend on the interphase impedance consisting of interphase transformer 20, reactor 25 and 3rd interphase transformer 21 since the commutating current passes through this interphase impedance. If the latter impedance is in resonance with the main transformer impedance the unbalancing voltage may be larger than the phase voltage between phase 44, 36 and phase 44, 34.

It will be readily understood from the foregoing analysis that when the alternate groups of anodes connected to the six alternate groups of terminals 32 to 35, 34 to 37,—30 to 33 are active, the direct current output of the 6-phase system comprising secondaries 15, 16 will be increased, while when the alternate groups of anodes connected to the six alternate groups of terminals 33 to 36, 35 to 38—31 to 34 are active the direct current output of the 6-phase system comprising secondaries 17, 18 is not increased. The net result of the commutating action is to increase the direct current output from the 6-phase system comprising secondaries 15, 16 over that from the 6-phase system comprising secondaries 17, 18, thus causing unbalance as hereinbefore stated in the output from the two 6-phase systems. It is to be noted that if the 3rd interphase transformer 21 is not provided with an air gap this transformer will be saturated in accordance with the excess direct current and such saturation will tend to accentuate the unbalance in output current in the two 6-phase systems.

That the foregoing theory of operation of the above noted cause responsible for unbalance between the outputs of the two 6-phase systems is correct is indicated, first, by the fact that reversal of direction of phase rotation should result in shifting the preponderance of load from one 6-phase system to the other. Load tests have shown such shifting to develop upon occurrence of reversal of the phase rotation. Second, since the commutating voltage rises with the direct current output the degree of boosting or increasing of the current and voltage in one of the 6-phase systems as hereinbefore described should increase as the direct current output increases. Load tests have shown a definite rise in per cent of peak voltage of one of the 6-phase systems as compared with that of the other 6-phase system as the direct current load was increased.

In order to prevent unbalancing of the two 6-phase systems shown in Fig. 1, I provide a plurality of reactors 45 each in series with a different one of the anode leads connected to terminals 29, 31, 33, 35, 37 and 39 of the secondary windings 15, 16. When the phase rotation of main transformer 13 is such that the output of the 6-phase group including secondaries 15, 16 tends to become greater than that from the 6-phase group including secondaries 17, 18 the rise of current is prevented by the reactors 45.

These reactors 45 it will be observed are in series not with leads connected to an interphase connection but with windings of the main transformer apparatus which impresses potential from the alternating current circuit upon the anodes. This main transformer apparatus in the embodiment of my invention shown in Fig. 1 comprises the single primary 14 and the two groups of secondaries 15, 16 and 17, 18. The reactors which prevent unbalance are, therefore, in the form of the invention illustrated in Fig. 1, associated with secondary windings of the main transformer apparatus, which windings in the present case are the secondaries 15, 16 of the 6-phase group which tends to be subjected to the larger load.

The system shown in Fig. 2 is in general similar to that above described in connection with Fig. 1. In Fig. 2, however, the main transformer apparatus 46 which impresses potentials on the anodes of rectifier 12 from the alternating current circuit 10 comprises instead of the single primary 14 shown in Fig. 1 a pair of primaries 47 and 48 which are associated respectively with the two secondaries 15, 16 and the two secondaries 17, 18.

In order to prevent unbalancing of the two 6-phase systems constituting the 12-phase system shown in Fig. 2, assuming as in the case of the 12-phase system shown in Fig. 1 that the 6-phase system including secondaries 15, 16 has the larger load, I provide a plurality of reactors 49 each in a different one of the leads connecting the alternating current circuit 10 to that primary 47 of the two main transformer primaries 47, 48 which is associated with these secondaries 15, 16. It will be seen that when the output of the 6-phase group including secondaries 15 and 16 tends to become greater than that from the other 6-phase group the undue rise of current in the former group will be prevented by the reactors 49.

It will be readily understood that unbalance in the 12-phase system shown in Fig. 2, including a pair of main transformer primaries associated with the pairs of secondaries included in the two 6-phase systems, may be prevented by the provision of reactors in the anode leads of one of the 6-phase systems as shown in Fig. 1.

While I have shown and described my invention with reference to an electric discharge apparatus of the vapor electric type and in which all of the anodes are enclosed in a single vessel it will be understood that I do not wish to be limited thereto, since any other suitable arrangement of electric discharge apparatus in which current is caused to flow unidirectionally between a negative conductor and a plurality of anodes, for rectifying or like purposes, may be employed. Thus while I have shown only two embodiments of my invention it will be understood that many modifications may be made therein and that I contemplate by the appended claims to cover any such modification as falls within the true spirit and scope of my invention.

What I claim as new and desire to secure by Letters Patent of the United States, is:

1. The combination of main transformer apparatus, two polyphase systems each provided with secondary windings comprised in said transformer apparatus and with an interphase connection including a reactor connected between the neutral terminals of said windings, an electric discharge apparatus, direct current terminals connected to said interphase connections and through said discharge apparatus to said windings, and means to prevent unbalance between the loads in said two polyphase systems, said means comprising a plurality of reactors associated with windings of said main transformer apparatus, said last-named windings being associated with that one only of said polyphase systems in which the load tends to rise above the load in the other of said polyphase systems.

2. The combination of main transformer apparatus, two 6-phase systems each provided with two 3-phase secondary windings comprised in said transformer apparatus and with an interphase connection including a reactor connected between the neutral terminals of said windings, an electric discharge apparatus, direct current terminals connected to said interphase connections and through said discharge apparatus to said secondary windings, and means to prevent unbalance between the loads in said two 6-phase systems, said means comprising a plurality of reactors associated with windings of said main transformer apparatus, said last-named windings being associated with that one only of said 6-phase systems in which the load tends to rise above the load in the other of said 6-phase systems.

3. The combination of main transformer apparatus, two 6-phase systems each provided with two 3-phase secondary windings comprised in said transformer apparatus and with an interphase connection including a condenser and a reactor connected between the neutral terminals of said windings, an electric discharge apparatus, direct current terminals connectced to said interphase connections and through said discharge apparatus to said secondary windings, and means to prevent unbalance between the loads in said two 6-phase systems, said means comprising a plurality of reactors associated with windings of said main transformer apparatus, said last-named windings being associated with that one of said 6-phase systems in which the load tends to rise above the load in the other of said 6-phase systems.

4. The combination of two polyphase systems each provided with main transformer secondary windings and with an interphase connection including a reactor connected between the neutral terminals of said windings, an electric discharge apparatus comprising a plurality of anodes, direct current terminals connected to said interphase connections and through said discharge apparatus to said windings, and a plurality of reactors each connected between a different one of said anodes and a different phase of the main transformer secondary windings of one of said two polyphase systems to prevent unbalance between the loads in said polyphase systems.

5. The combination of two polyphase systems each provided with main transformer secondary windings and with an interphase connection including a condenser and a reactor connected between the neutral terminals of said windings, an electric discharge apparatus comprising a plurality of anodes, direct current terminals connected to said interphase connections and through said discharge apparatus to said windings, and a plurality of reactors each connected between a different one of said anodes and a different phase of the main transformer secondary windings of one of said two polyphase systems to prevent unbalance between the loads in said polyphase systems.

6. The combination of two 6-phase systems each provided with two 3-phase main transformer secondary windings and with an interphase connection including a reactor connected between the neutral terminals of said windings, an electric discharge apparatus comprising a plurality of anodes, direct current terminals connected to said interphase connections and through said discharge apparatus to said windings, and a plurality of reactors each connected between a different one of said anodes and a different phase of the 3-phase transformer secondary windings of one of said two 6-phase systems to prevent unbalance between the loads in said 6-phase systems.

7. The combination of two 6-phase systems each provided with two 3-phase main transformer secondary windings and with an interphase connection including a condenser and a reactor connected between the neutral terminals of said windings, an electric discharge apparatus comprising a plurality of anodes, direct current terminals connected to said interphase connections and through said discharge apparatus to said windings, and a plurality of reactors each connected between a different one of said anodes and a different phase of the 3-phase transformer secondary windings of one of said two 6-phase systems to prevent unbalance between the loads in said 6-phase systems.

8. The combination of an alternating current circuit, two polyphase primary windings, two polyphase systems each provided with secondary windings associated with a different one of said primary windings, each of said polyphase systems being provided with an interphase connection including a reactor connected between the neutral terminals of said secondary windings, an electric discharge apparatus, direct current terminals connected to said interphase connections and through said discharge apparatus to said secondary windings, and a plurality of reactors each connected between one of said polyphase primary winding and a different phase of said alternating current circuit, said one of said primary windings being associated with the secondary windings comprised in that one of said two polyphase systems in which the load tends to rise above the load in the other of said polyphase systems.

9. The combination of an alternating current circuit, two polyphase primary windings, two polyphase systems each provided with secondary windings associated with a different one of said primary windings, each of said polyphase systems being provided with an interphase connection including a condenser and a reactor connected between the neutral terminals of said secondary windings, an electric discharge apparatus, direct current terminals connected to said interphase connections and through said discharge apparatus to said secondary windings, and a plurality of reactors each connected between one of said polyphase primary winding and a different phase of said alternating current circuit, said one of said primary windings being associated with the secondary windings comprised in that one of said two polyphase systems in which the load tends to rise above the load in the other of said polyphase systems.

10. The combination of an alternating current circuit, two 3-phase primary windings, two 6-phase systems each provided with two 3-phase secondary windings associated with a different one of said primary windings, each of said 6-phase systems being provided with an interphase connection including a reactor connected between the neutral terminals of said secondary windings, an electric discharge apparatus, direct current terminals connected to said interphase connections and through said discharge apparatus to said secondary windings, and a plurality of reactors each connected between one of said primary windings and a different phase of said alternating current circuit, said one of said primary windings being associated with the secondary windings comprised in that one of said two 6-phase systems in which the load tends to rise above the load in the other of said 6-phase systems.

11. The combination of an alternating current circuit, two 3-phase primary windings, two 6-phase systems each provided with two 3-phase secondary windings associated with a different one of said primary windings, each of said 6-phase systems being provided with an interphase connection including a condenser and a reactor connected between the neutral terminals of said secondary windings, an electric discharge apparatus, direct current terminals connected to said interphase connections and through said discharge apparatus to said secondary windings, and a plurality of reactors each connected between one of said primary windings and a different phase of said alternating current circuit, said one of said primary windings being associated with the secondary windings comprised in that one of said two 6-phase systems in which the load tends to rise above the load in the other of said 6-phase systems.

CAMIL A. SABBAH.